(No Model.)

J. MARIANI.
PNEUMATIC TIRE FOR BICYCLES.

No. 522,689. Patented July 10, 1894.

Witnesses:
Chas. N. Gooding.
Frank B. Masters.

Inventor:
John Mariani,
by his attorney,
Edward S. Beach.

UNITED STATES PATENT OFFICE.

JOHN MARIANI, OF BOSTON, MASSACHUSETTS.

PNEUMATIC TIRE FOR BICYCLES.

SPECIFICATION forming part of Letters Patent No. 522,689, dated July 10, 1894.

Application filed June 5, 1893. Serial No. 476,573. (No model.)

*To all whom it may concern:*

Be it known that I, JOHN MARIANI, a subject of the King of Italy, residing at Boston, in the county of Suffolk and State of Massachusetts, have invented a new and useful Sheath for Tires for Bicycles and other Vehicles, of which the following is a specification, reference being had to the accompanying drawings, in which—

Figure 1:
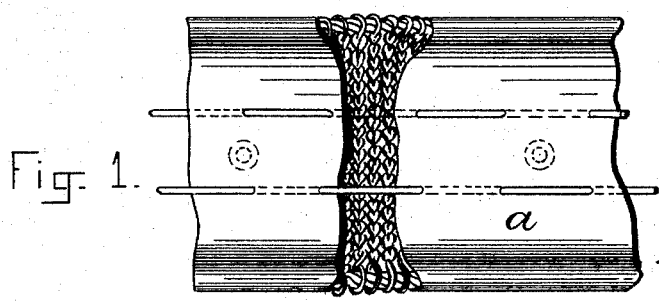
Figure 2:
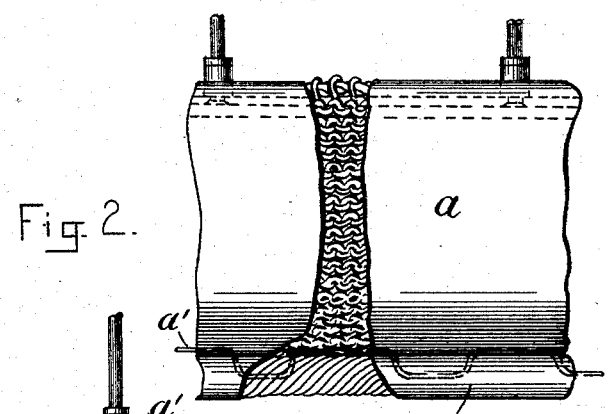
Figure 3:
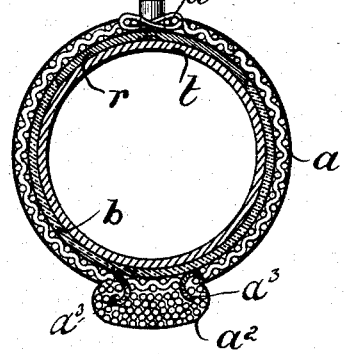
Figure 4:
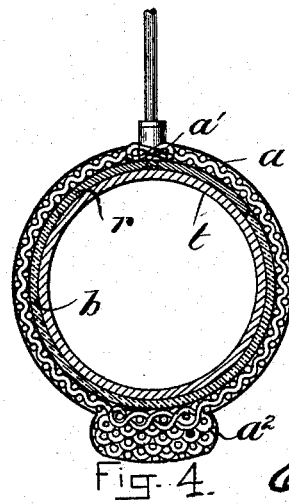

Figure 1 is a plan view of a portion of a sheath embodying my invention. Fig. 2 is a side view of what is shown in Fig. 1. Fig. 3 shows one form of my new sheath in place. Fig. 4 shows a modification.

My invention relates to bicycle and other tires and is a recticulated sheath having an exterior, projecting rib.

In the drawings, $a$ is the reticulated sheath and $a'$ lacings by means of which the sheath is preferably held in place. Sheath $a$ is either braided or woven out of suitable material, such as stout hemp twine, for example, and is combined with an exterior projecting rib $a^2$ which is formed out of twine or strands of other material, (preferably by braiding,) but secured to the threads of the sheath proper by combining threads $a^3$, as shown in Fig. 3. Rib $a^2$ forms the tread of the tire, and forms a novel and satisfactory cushion, the action of which is agreeable to the rider. After the reticulated sheath is produced, I treat it with a suitable paint to stop the interstices and protect the sheath from the action of the weather; and I usually insert a strip of felt or other suitable material between sheath $a$ and air-tube $f$.

In Fig. 4, showing a modification, the exterior, projecting rib $a^2$ is integral with sheath $a$, being woven or braided out of the same twine or other strands of any suitable material that constitutes the main body of the sheath.

What I claim is—

1. The herein described reticulated sheath for bicycle and other tires, the same having an exterior projecting rib formed of strands combined together, all substantially as and for the purpose set forth.

2. The herein described combination of a reticulated sheath, an air-tube and an intermediate cushioning strip, the sheath having an exterior projecting rib composed of strands, all substantially as and for the purpose set forth.

JOHN MARIANI.

Witnesses:
EDWARD S. BEACH,
F. L. GOODHUE.